US011225186B2

(12) United States Patent
Lifson et al.

(10) Patent No.: US 11,225,186 B2
(45) Date of Patent: Jan. 18, 2022

(54) PERFORMANCE AND POSITION MONITORING OF A MOBILE HVAC AND R UNIT

(71) Applicant: Carrier Corporation, Jupiter, FL (US)

(72) Inventors: Alexander Lifson, Manlius, NY (US); Michael F. Taras, Fayetteville, NY (US)

(73) Assignee: Carrier Corporation, Jupiter, FL (US)

( * ) Notice: Subject to any disclaimer, the term of this patent is extended or adjusted under 35 U.S.C. 154(b) by 150 days.

(21) Appl. No.: 15/727,138

(22) Filed: Oct. 6, 2017

(65) Prior Publication Data

US 2018/0043816 A1    Feb. 15, 2018

Related U.S. Application Data

(62) Division of application No. 13/380,786, filed as application No. PCT/US2010/039193 on Jun. 18, 2010, now abandoned.
(Continued)

(51) Int. Cl.
*B60P 3/20* (2006.01)
*B60H 1/00* (2006.01)
(Continued)

(52) U.S. Cl.
CPC .......... *B60P 3/20* (2013.01); *B60H 1/00014* (2013.01); *B60H 1/00585* (2013.01);
(Continued)

(58) Field of Classification Search
CPC ............ B60H 1/00585; B60H 1/00657; B60H 1/00771; B60H 1/00778; H04W 4/02;
(Continued)

(56) References Cited

U.S. PATENT DOCUMENTS 4,967,567 A * 11/1990 Proctor .............. B60H 1/00585
62/127
5,181,389 A    1/1993 Hanson et al.
(Continued)

FOREIGN PATENT DOCUMENTS

DE    102004050874 A1    4/2006
GB       2408792 A       6/2005
(Continued)

OTHER PUBLICATIONS

JP-2005241089-A English Translation (Year: 2005).*
(Continued)

*Primary Examiner* — Schyler S Sanks
(74) *Attorney, Agent, or Firm* — Getz Balich LLC

(57) ABSTRACT

A system for monitoring a mobile refrigerant system including one or more system components is provided. The system includes a global positioning system, a performance monitor, and a processor. The global positioning system includes a receiver that provides a locator signal. The performance monitor provides a monitor signal indicative of operational performance of at least one of the system components of the refrigerant system. The processor is adapted to receive and combine the locator signal and the monitor signal, and produce a combined locator and monitor signal output.

22 Claims, 1 Drawing Sheet

Related U.S. Application Data

(60) Provisional application No. 61/219,560, filed on Jun. 23, 2009.

(51) Int. Cl.
*H04W 4/029* (2018.01)
*H04L 29/08* (2006.01)

(52) U.S. Cl.
CPC ..... *B60H 1/00657* (2013.01); *B60H 1/00778* (2013.01); *H04W 4/029* (2018.02); *H04L 67/125* (2013.01)

(58) Field of Classification Search
CPC ................. H04W 4/029; F25B 49/022; F25B 2700/21173; F25B 49/02
See application file for complete search history.

(56) References Cited

U.S. PATENT DOCUMENTS

| | | | |
|---|---|---|---|
| 5,437,163 A | 8/1995 | Jurewicz et al. | |
| 5,491,486 A | 2/1996 | Welles, II et al. | |
| 6,058,716 A | 5/2000 | Reason et al. | |
| 6,318,100 B1 | 11/2001 | Brendel et al. | |
| 6,543,242 B2 | 4/2003 | Reason et al. | |
| 6,708,507 B1* | 3/2004 | Sem | B60H 1/3225 62/126 |
| 6,718,263 B1 | 4/2004 | Glass et al. | |
| 7,092,794 B1 | 8/2006 | Hill et al. | |
| 7,356,396 B2 | 4/2008 | Mori et al. | |
| 7,430,371 B2 | 9/2008 | So | |
| 7,451,005 B2 | 11/2008 | Hoffberg et al. | |
| 7,658,334 B2 | 2/2010 | Glielmo et al. | |
| 2003/0182950 A1 | 10/2003 | Mei et al. | |
| 2004/0247492 A1 | 12/2004 | Karney | |
| 2005/0073406 A1 | 4/2005 | Easley et al. | |
| 2006/0164239 A1 | 7/2006 | Loda | |
| 2006/0200560 A1 | 9/2006 | Waugh et al. | |
| 2006/0264221 A1 | 11/2006 | Koike et al. | |
| 2007/0012052 A1* | 1/2007 | Butler | G05D 23/1904 62/181 |
| 2007/0040647 A1 | 2/2007 | Saenz et al. | |
| 2007/0157649 A1* | 7/2007 | Pedersen | F25B 49/02 62/228.1 |
| 2007/0239321 A1 | 10/2007 | McAden | |
| 2007/0267509 A1 | 11/2007 | Witty et al. | |
| 2007/0268121 A1* | 11/2007 | Vasefi | G06Q 10/06 340/506 |
| 2008/0077260 A1* | 3/2008 | Porter | F25B 49/005 62/129 |
| 2008/0236177 A1* | 10/2008 | Senba | F24F 11/30 62/157 |
| 2008/0252428 A1 | 10/2008 | Robinson et al. | |
| 2008/0262646 A1 | 10/2008 | Breed | |
| 2009/0015400 A1 | 1/2009 | Breed | |
| 2009/0061897 A1 | 3/2009 | Hamilton et al. | |
| 2010/0107661 A1 | 5/2010 | Awwad et al. | |

FOREIGN PATENT DOCUMENTS

| | | |
|---|---|---|
| JP | 2004272752 A | 9/2004 |
| JP | 2005241089 A * | 9/2005 |
| KR | 1020070016305 | 8/2007 |
| WO | WO0124393 A1 | 4/2001 |
| WO | WO0197555 A2 | 12/2001 |
| WO | WO08115901 | 9/2008 |
| WO | WO08143532 | 11/2008 |

OTHER PUBLICATIONS

Lumikko, "OptiTemp Temperature Recording Solutions", Feb. 5, 2009.
Lumikko, "OptiTemp IV, Temperature Recording", Feb. 16, 2009.
"Cargobull Telematics—100% More Transparency for your Business—100 Good Reasons for a Pinpoint Disposition", Sep. 2008.
Ingersoll-Rand Company, "i-Box—Universal Interface for Telematics Applications", Aug. 2006.

* cited by examiner

PERFORMANCE AND POSITION MONITORING OF A MOBILE HVAC AND R UNIT

This application is a divisional of U.S. patent application Ser. No. 13/380,786 filed Dec. 23, 2011, which is a national stage application of PCT Patent Appln. No. PCT/US2010/039193 filed Jun. 18, 2010, which claims priority to U.S. Provisional Patent Application No. 61/219,560 filed Jun. 23, 2009, the disclosures of which are herein incorporated by reference.

BACKGROUND OF THE INVENTION

1. Technical Field

This disclosure relates generally to monitoring a refrigerant system and, more particularly, to monitoring the performance and the position of a refrigerant system.

2. Background Information

Mobile refrigerant systems (also known as "heating, ventilation, air conditioning and refrigeration ("HVAC&R") systems") are used to control internal environmental conditions in mobile units. For example, environmental conditions within an internal compartment of a vehicle, a trailer or a shipping container may be controlled using heating and/or cooling components in a refrigerant system. Such refrigerant systems are used to maintain favorable conditions for occupants and/or to prevent/reduce damage to cargo.

To improve performance and control, environmental conditions within a compartment are monitored by an environmental monitoring system, whereas operational performance of components (e.g., refrigerant compressors, condensers, evaporators, fans, expansion devices and heating elements) is monitored by a performance monitoring system (also known as "diagnostics systems"). For example, an environmental monitoring system may monitor temperature and humidity within a compartment, whereas a performance monitoring system may monitor whether components of a refrigerant system controlling the environment in the compartment are operating within predetermined tolerances or whether the components are malfunctioning. However, prior art performance monitoring systems generally provide little or no data about how a mobile refrigerant system is being operated at a particular time and corresponding location or whether the system is being misused. This lack of data may lead to difficulty in determining the cause of equipment failure, how long the equipment can operate before failure occurs, responsibility/liability for a failure of the refrigerant system and/or for damage to goods within the compartment.

SUMMARY OF THE DISCLOSURE

According to one aspect of the present invention, a system for monitoring performance of a mobile refrigerant system including one or more system components is provided. The system includes a global positioning system, a performance monitor, and a processor. The global positioning system includes a receiver that provides a locator signal. The performance monitor provides a monitor signal indicative of operational performance of at least one of the system components of the refrigerant system. The processor is adapted to receive and combine the locator signal and the monitor signal, and produce a combined locator and monitor signal output.

According to another aspect of the present invention, a method of monitoring a mobile refrigerant system is provided. The method includes the steps of: a) providing a mobile refrigerant system having one or more system components and a processor having an output; b) receiving a locator signal indicative of a position of the refrigerant system; c) receiving a monitor signal indicative of operational performance of at least one of the system components; and d) combining the locator signal and the monitor signal using the processor into a combined signal representative of location and performance at a point in time.

DETAILED DESCRIPTION OF THE INVENTION

Figure 1:
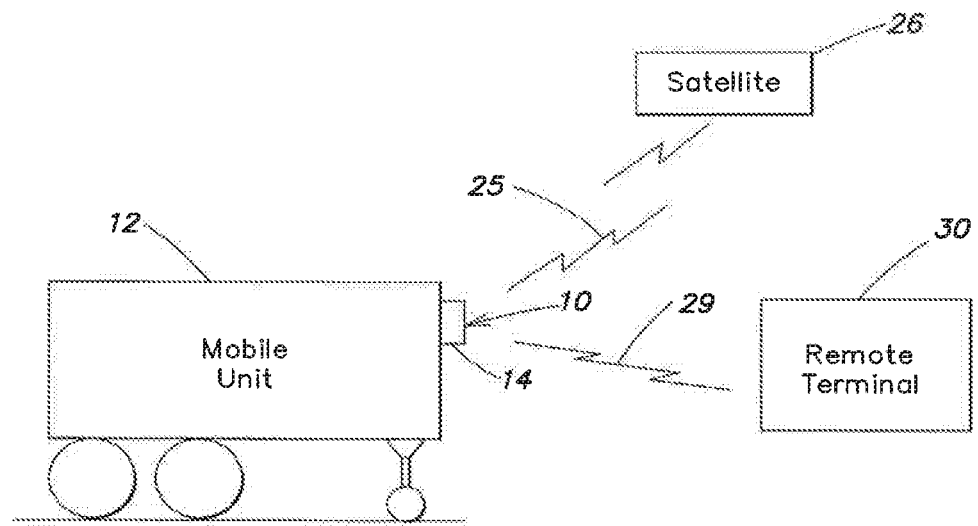
FIG. 1 is a diagrammatic illustration including the present system.

Now referring to FIG. 1, a mobile refrigerant system 10 ("HVAC&R system") is adapted to control environmental conditions within an internal compartment in a mobile unit 12 such as, but not limited to, a vehicle, a trailer, a shipping container, etc. The HVAC&R system 10 includes one or more system components such as, but not limited to, at least one heating system component and/or one or more cooling system components (e.g. a condenser, an evaporator and/or a compressor), and also includes a system 14 for monitoring performance of the HVAC&R system 10 (referred to hereinafter as a "monitoring system 14").

Figure 2:
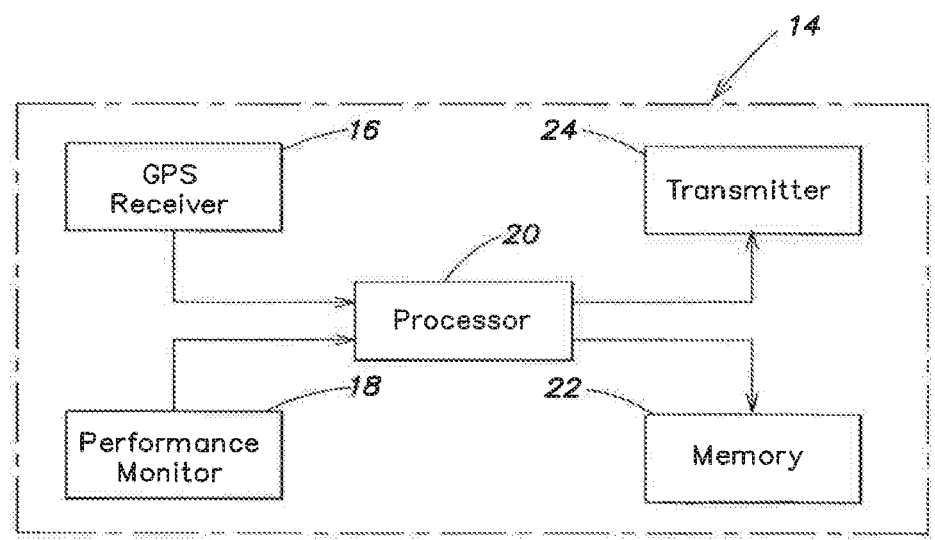
FIG. 2 is a diagrammatic illustration of an embodiment of a system for monitoring a mobile refrigerant system.

An embodiment of the present monitoring system 14 is shown diagrammatically in FIG. 2. The monitoring system 14 includes a global positioning system ("GPS") receiver 16, a performance monitor 18, and a processor 20. In some embodiments, the monitoring system 14 further includes a memory 22 and/or a transmitter 24.

The GPS receiver 16 is configured to receive one or more GPS signals 25, for example, from a plurality of satellites 26 (see FIG. 1) and/or cell telephone towers, and to provide a locator signal which is a function of the GPS signal. The GPS signals 25 may include, for example, satellite beacons from the satellites 26. The locator signal is indicative of a latitudinal position and a longitudinal position, and in some instances a relative elevation, of the HVAC&R system 10 and mobile unit 12 at a point in time. The point in time may represent a single discrete point in time or a period of time.

The performance monitor 18 is configured to monitor operational performance of at least one of the system components of the HVAC&R system 10. For example, the performance monitor 18 can be configured to monitor operational parameters such as, but not limited to, refrigerant pressure, temperature (e.g., of a liquid refrigerant, system components, compartment air, cargo, etc.), humidity, airflow, vibration, sound (e.g., acoustical emissions), operational speed (e.g., the rotational speed of the compressor or the fan, etc.), electrical current, electrical voltage, electrical frequency, and/or operational state (e.g., whether the monitored component or the entire HVAC&R system 10 is on or off). The performance monitor 18 is further configured to provide a monitor signal indicative of the operational performance of the monitored components and/or the entire HVAC&R system 10 at a point in time, which may be a discrete point in time, or a period in time. The point in time at which the operational data is collected may be the exact same point in time as when the location data is collected. Alternatively, there may be a difference between the two that is either known, or is of such a small amount so as to be inconsequential.

The processor 20 is configured to receive and combine the locator signal and the monitor signal into a single combined locator and monitor signal. The combined locator and monitor signal is indicative of the position of the HVAC&R system 10 and mobile unit 12, and the operational performance of the monitored system components at a particular point in time. In the embodiment shown in FIG. 2, the GPS receiver 16 and the performance monitor 18 are in signal communication with the processor 20. The processor 20 is further in selective signal communication with the memory 22 and/or the transmitter 24.

In operation of the system in FIG. 1, the GPS receiver 16 receives the GPS signal 25 from one or more of the satellites 26 and outputs the locator signal which is indicative of the position of the HVAC&R system 10 and mobile unit 12 at a point in time. Concurrently or proximately thereto, the performance monitor 18 monitors the operational performance of one or more of the system components of the HVAC&R system 10 and outputs the monitor signal which is indicative of the operational performance of the monitored components and/or the entire HVAC&R system 10.

The processor 20 receives the locator signal from the GPS receiver 16 and the monitor signal from the performance monitor 18 and combines the signals into a single combined locator and monitor signal. In some embodiments, the processor 20 outputs the combined locator and monitor signal via a network (e.g., a wireless network) to the transmitter 24, where the signal 29 may be transmitted to a remote terminal 30 (see FIG. 1); e.g., a terminal located at the business in charge of the mobile unit, etc. In some embodiments, the processor 20 outputs the combined locator and monitor signal to the memory 22 for storage and later retrieval.

Information about the performance of the HVAC&R system 10 may be determined from the combined locator and monitor signal data. The operational performance component of the combined signal data, for example, can provide information indicative of whether the HVAC&R system 10 malfunctioned, when it malfunctioned, or if it is likely to malfunction. For example, signal data indicating a rapid increase in the temperature or pressure of the fluid refrigerant, an increased sound level or irregular component vibrations, etc., may be indicative of an HVAC&R system 10 malfunction. Conversely, signal data may further indicate that the HVAC&R system 10 was being properly operated during a particular period of time at a particular location.

The locator component of the combined signal data corresponding to the operational performance component can provide information relating to where the HVAC&R system 10 was being operated and therefore who had control of it. For example, the locator component of the signal data corresponding to the time of the malfunction may indicate that the HVAC&R system 10 was being operated on a mobile unit 12 (e.g., truck-trailer) while in transit between two shipping terminals.

The combined locator and monitor signal data available using the present invention can be used for instance in a determination of liability where the mobile unit 12 or the associated HVAC&R system 10 is damaged. A warranty covering an HVAC&R system 10 may include terms that void the warranty under certain operational circumstances, the existence of which circumstances may be proved or disproved based on the combined signal data. Alternatively, where the combined signal data establishes that an HVAC&R system 10 was properly operating between destinations, the HVAC&R manufacturer may avoid liability for damage to contents. As another example, the combined signal data may be used to establish that the failure of the HVAC&R system 10 was a result of improper operation rather than system failure.

The combined signal data can also be used to schedule maintenance on an HVAC&R system 10 based on the combined signal data indicating the increased likelihood of a potential malfunction.

The combined signal data can also be used to switch HVAC&R system 10 to a less demanding operational regime, referred to as a "reduced" operational regime (e.g., where the HVAC&R system 10 uses less power and/or operates at a reduced speed than normal operating conditions, etc.). For example, where the combined signal indicates that one or more of the monitored components and/or the entire HVAC&R system 10 are likely to malfunction, the HVAC&R system 10 is switched to a less demanding operational regime until the HVAC&R. system 10, or a system component therein, is repaired or replaced. A warning signal can also be issued to schedule a technician to perform the necessary repairs. In addition, as set forth above, the combined signal may also indicate who is liable for the costs associated with the necessary repairs.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A system for monitoring a mobile refrigerant system including one or more system components, comprising:
   a global positioning system receiver that provides a locator signal;
   a performance monitor configured to monitor one or more operational parameters of at least one of the system components of the refrigerant system and to provide a monitor signal indicative of the one or more operational parameters, wherein the one or more operational parameters comprise at least one of airflow humidity, sound or operational speed in at least one of the system components; and
   a processor that receives and combines the locator signal and the monitor signal, and produces a combined locator and monitor signal output; and
   wherein the system is configured to process the combined locator and monitor signal output to predict whether the mobile refrigerant system is going to malfunction; and
   wherein the system is further configured to process the combined locator and monitor signal output to determine whether a failure in operation of the mobile refrigerant system is a result of improper operation of the mobile refrigerant system or a system failure.

2. The system of claim 1, wherein the system is configured to provide a warning based on the predicted malfunction.

3. The system of claim 1, wherein the system is configured to schedule maintenance based on the predicted malfunction.

4. The system of claim 1, wherein the system is configured to process the combined locator and monitor signal output to assign responsibility where a malfunction has occurred with the mobile refrigerant system.

5. The system of claim 1, further comprising a transmitter that receives and transmits the combined locator and monitor signal output.

6. The system of claim 1, further comprising a memory that receives and stores the combined locator and monitor signal output.

7. The system of claim 1, wherein the combined locator and monitor signal output includes positional data associated with a point in time, and operational performance data associated with substantially the same point in time.

8. The system of claim 1, wherein the monitor signal further includes data indicative airflow temperature.

9. The system of claim 1, wherein the monitor signal further includes data indicative of at least one of temperature, electrical current and operational state in at least one of the system components.

10. The system of claim 1, wherein the mobile refrigerant system is configured to control an environment within a container.

11. A system for monitoring a mobile refrigerant system including one or more system components, comprising:
   a global positioning system receiver that provides a locator signal;
   a performance monitor configured to monitor one or more operational parameters of at least one of the system components of the refrigerant system and to provide a monitor signal indicative of the one or more operational parameters, the one or more parameters comprising airflow humidity, sound and/or operational speed in at least one of the system components; and
   a processor that receives and combines the locator signal and the monitor signal, and produces a combined locator and monitor signal output;
   wherein the system is configured to process the combined locator and monitor signal output to determine whether a failure in operation of the mobile refrigerant system is a result of improper operation of the mobile refrigerant system.

12. The system of claim 11, wherein
   the system is configured to process the combined locator and monitor signal output to predict whether the mobile refrigerant system is going to malfunction; and
   the system is configured to provide a warning based on the predicted malfunction.

13. The system of claim 11, wherein
   the system is configured to process the combined locator and monitor signal output to predict whether the mobile refrigerant system is going to malfunction; and
   the system is configured to schedule maintenance based on the predicted malfunction.

14. The system of claim 11, wherein the system is configured to process the combined locator and monitor signal output to assign responsibility where a malfunction has occurred with the mobile refrigerant system.

15. The system of claim 11, wherein the one or more parameters comprise the airflow humidity in the at least one of the system components.

16. The system of claim 1, wherein the one or more parameters comprise the airflow humidity in the at least one of the system components.

17. A system for monitoring a mobile refrigerant system including one or more system components, comprising:
   a global positioning system receiver that provides a locator signal;
   a performance monitor configured to monitor one or more operational parameters of at least one of the system components of the refrigerant system and to provide a monitor signal indicative of the one or more operational parameters, the one or more operational parameters comprising at least one of airflow humidity, sound or operational speed in at least one of the system components; and
   a processor configured to receive and combine the locator signal and the monitor signal, and the processor further configured to produce a combined locator and monitor signal output;
   wherein the system is configured to process the combined locator and monitor signal output to establish that a failure in operation of the mobile refrigerant system is a result of improper operation of the mobile refrigerant system rather than a system failure.

18. The system of claim 17, wherein the system is configured to process the combined locator and monitor signal output to predict whether the mobile refrigerant system is going to malfunction.

19. The system of claim 1, wherein the one or more parameters comprise the sound in the at least one of the system components.

20. The system of claim 1, wherein the one or more parameters comprise the operational speed in the at least one of the system components.

21. The system of claim 17, wherein the system is configured to switch to a reduced power when the combined locator and monitor signal output is indicative of the one or more system components and/or the system being likely to malfunction.

22. The system of claim 17, wherein the system is configured to switch to a reduced speed when the combined locator and monitor signal output is indicative of the one or more system components and/or the system being likely to malfunction.

* * * * *